UNITED STATES PATENT OFFICE.

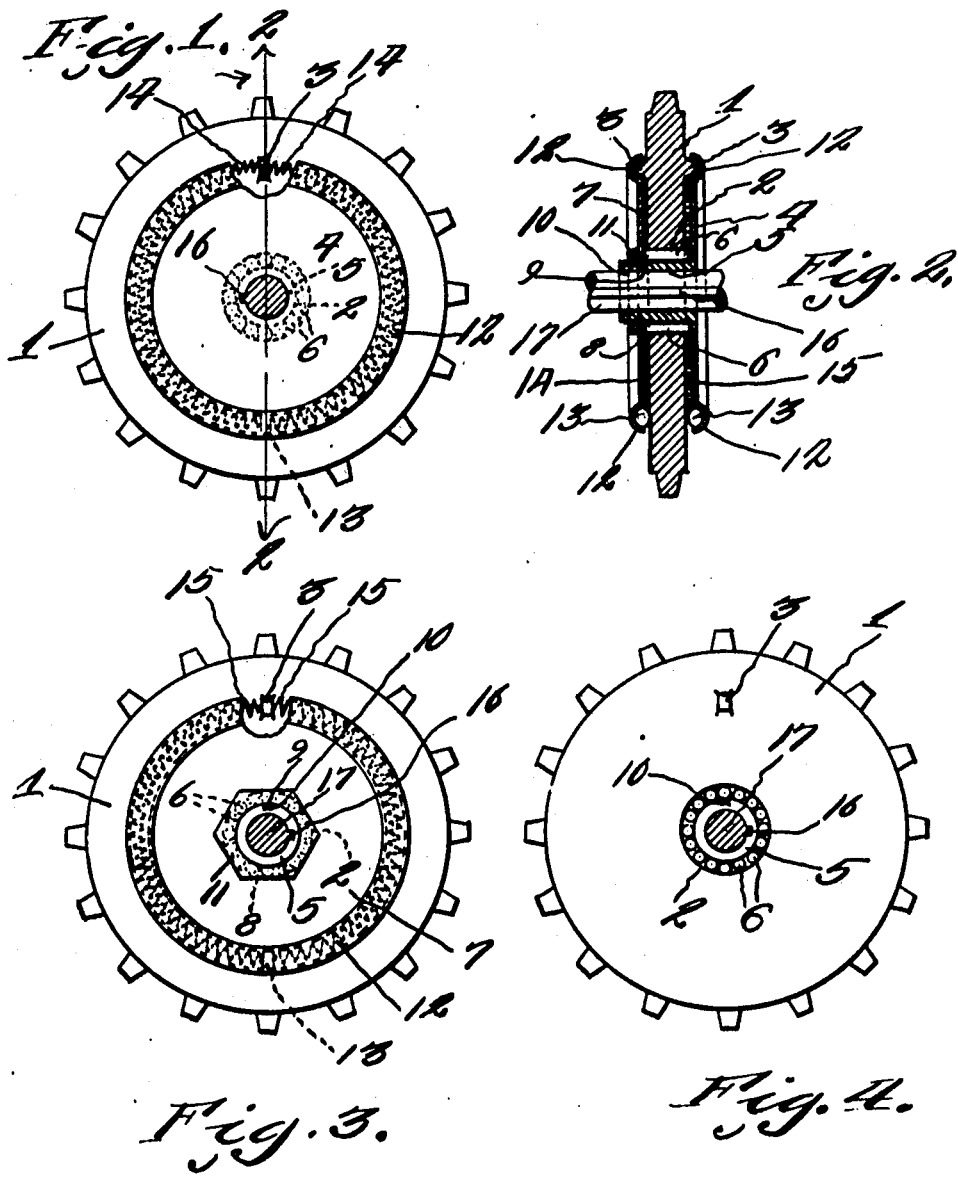

HELMER ULLENSAKER, OF HATTON, NORTH DAKOTA.

STRAIN-ABSORBER FOR SPROCKET-WHEELS.

1,190,049.  Specification of Letters Patent.  Patented July 4, 1916.

Application filed October 7, 1915. Serial No. 54,520.

*To all whom it may concern:*

Be it known that I, HELMER ULLENSAKER, a citizen of the United States, residing at Hatton, in the county of Traill, State of North Dakota, have invented a new and useful Strain-Absorber for Sprocket-Wheels; and I do hereby declare the following to be a full, clear, and exact description of the invention, such as will enable others skilled in the art to which it appertains to make and use the same.

This invention relates to the art of gearing, and particularly to an improved strain absorber for a sprocket wheel, to take up or absorb or relieve the sudden strain or jerk of the chain upon the sprocket, when power is first applied to the chain or sprocket.

One of the features of the invention is to provide a sprocket having annular plates upon opposite sides having threaded connections or clamping means, so that the plate will move as one body, the outer edge portion of the plates being formed with annular channels, in which yieldable connections are arranged, to coöperate with lugs upon opposite sides of the sprocket, so that when power is exerted upon the sprocket chain (not shown), or upon the shaft, to which one of the plates is splined or feathered, the sudden strain will be relieved or absorbed, and after the sprocket and its chain is under way, the chain and the sprocket will coöperate in the same manner as the ordinary sprocket and chain.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of a sprocket, showing the improved strain absorber as applied. Fig. 2 is a sectional view on line 2—2 of Fig. 1. Fig. 3 is a view in elevation showing the opposite side to that shown in Fig. 1. Fig. 4 is a view in elevation showing the annular plate shown in Fig. 3 removed.

Referring to the drawings more especially 1 designates a sprocket wheel having a central opening 2, and provided upon its opposite faces with directly opposite lugs 3. Adjacent one of the faces of the sprocket wheel an annular plate 3 is arranged, which plate 4 is provided with a hub sleeve 5, which extends through the opening 2 of the sprocket. This hub sleeve is smaller in diameter than the opening 2 of the sprocket, there being a plurality of anti-frictional roller bearings 6 between the hub sleeve and the wall of the opening 2, so that when the sprocket yields relative to the plate 4, and vice versa, said roller bearings 6 act to materially reduce the friction between the hub sleeve 5 and the sprocket. Arranged upon the opposite face of the sprocket 1 is an annular plate 7 having a central opening 8, to receive the hub sleeve 5. The opening 8 of the plate 7 has a radially extending lug 9 extending into a longitudinal groove 10 of the hub sleeve, thereby keying the plate 7 to the hub sleeve, so that the two plates 7 and 4 will rotate or move together or as one body. A nut 11 is threaded upon the end of the hub sleeve, so as to hold the plate 7 in place, as well as preventing displacement of the roller bearings. The outer portions of the plates 4 and 7 are constructed, bent or shaped to form annular channels 12, which are semi-circular in cross section, and are designed to receive the lugs 3 of the sprocket. Formed in the channels of said plates 4 and 7 are lugs 13, and said plates 4 and 7 are so arranged upon the sprocket that the lugs 13 are diametrically opposite the lugs 3. Arranged between the lug 13 of the plate 4 and the lug 3 of the side of the sprocket adjacent the plate 4 are coil springs 14, which are received in the channel 12 of the plate 4. Arranged between the lug 13 of the plate 7 and the lug 3 of the face of the sprocket adjacent the plate 7 are coil springs 15, which are received in the channel 12 of the plate 7. It will be seen that owing to the lugs 13 being carried by the plates 4 and 7, and that the lugs 3 are carried by the sprocket 1, that either the plates 4 and 7, or the sprocket 1 will yield relative to one another, so as to relieve or absorb the strain, either upon the sprocket, or upon said plates. The hub sleeve 5 of the plate 4 has a key connection or spline 16 with the shaft 17. It will be observed that if power is applied to the shaft 17, that the plates 4 and 7 will first move in one direction or the other yieldably relative to the sprocket, thereby causing the sprocket to gradually move the chain (not shown) of the sprocket. If the chain (not shown) of the sprocket first receives power, the sprocket will first move yieldably relative to the plates 4 and 7, and thereby causing the plates to gradually move, which in turn will impart movement to the shaft 7. In both of these instances the strain is relieved or absorbed. After the parts of the sprocket are well under movement, the parts of the sprocket resume their normal position substantially.

The invention having been set forth, what is claimed as new and useful is:—

In combination, a sprocket having a central opening and provided upon its opposite faces with directly opposite lugs, a pair of annular plates, one arranged adjacent each side or face of the sprocket, one of said plates having a centrally arranged sleeve integral therewith extending through said opening and being keyed to the opposite plate, roller bearings in said opening of the sprocket and surrounding said sleeve, said roller bearing being longer than the width of the sprocket and almost engaging the inner faces of said plates, a member threaded upon said sleeve to hold the keyed plate keyed to the sleeve, a shaft extending axially through the sleeve and having splined connections therewith, said plates upon their inner faces adjacent their edge portions having annular channels semi-circular in cross section corresponding to and receiving the lugs of the sprocket, said channels having directly opposite lugs, which are diametrically opposite the lugs of the sprocket, and springs in said channels coöperating between the lugs of the channels and the lugs of the sprocket.

In testimony whereof I have signed my name to this specification in the presence of two subscribing witnesses.

HELMER ULLENSAKER.

Witnesses:
CHAS. A. LYCHE,
S. E. WISETH.

Copies of this patent may be obtained for five cents each, by addressing the "Commissioner of Patents, Washington, D. C."